J. W. LIVERMORE.
TRACTOR.
APPLICATION FILED NOV. 11, 1919.
1,363,330.
Patented Dec. 28, 1920.
4 SHEETS—SHEET 3.
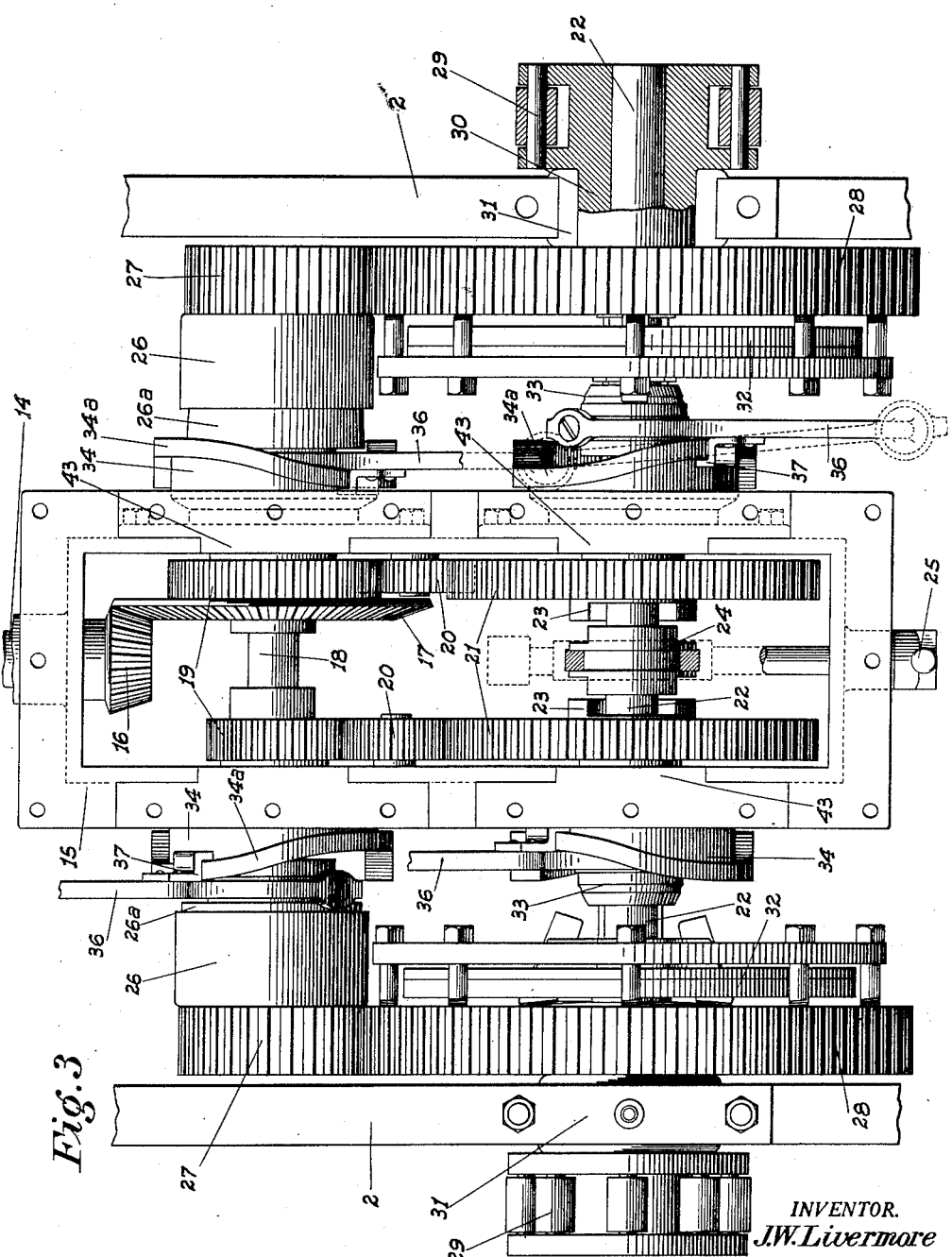
INVENTOR.
J.W. Livermore
BY
ATTORNEY

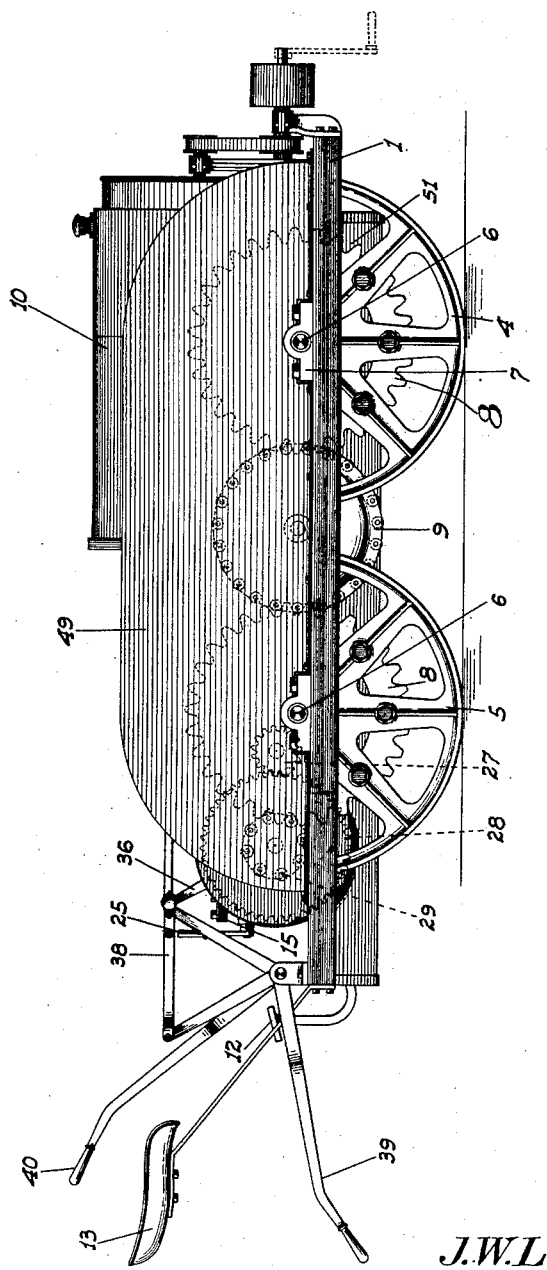

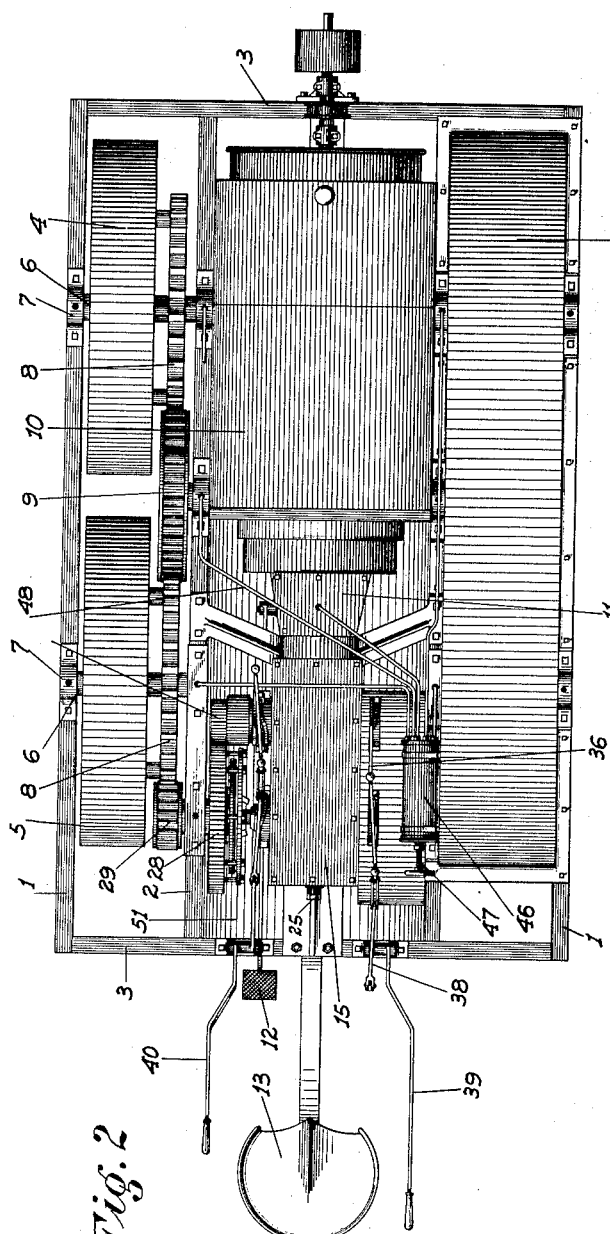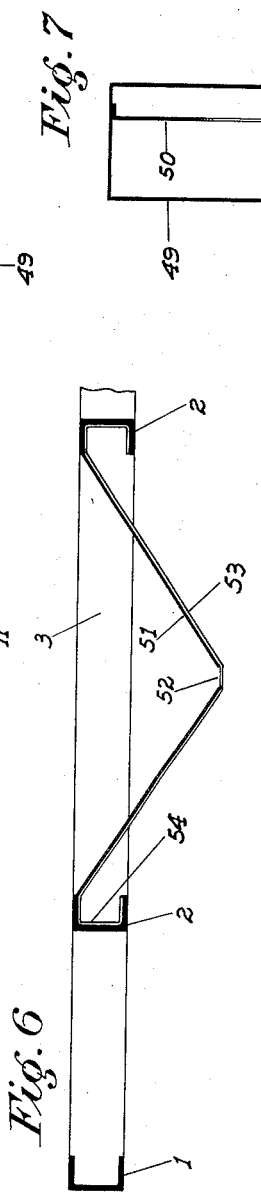

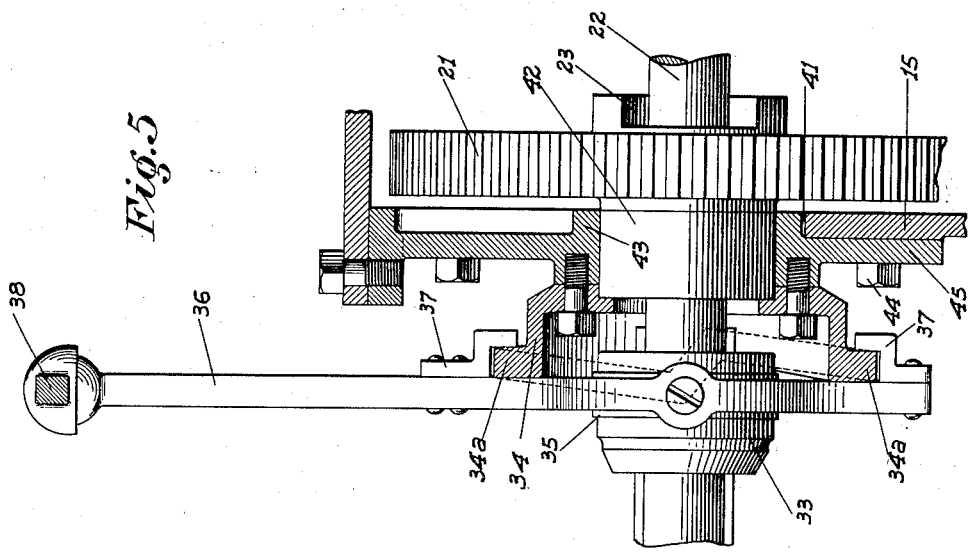
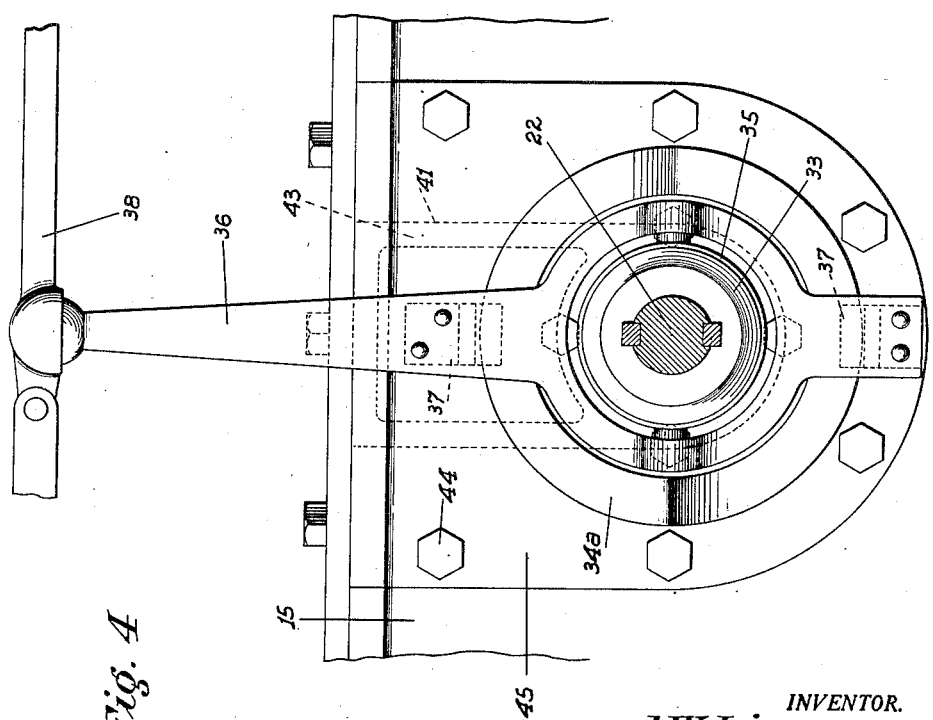

UNITED STATES PATENT OFFICE.

JOHN W. LIVERMORE, OF FRESNO, CALIFORNIA, ASSIGNOR OF ONE-HALF TO LISENBY MANUFACTURING COMPANY, OF FRESNO, CALIFORNIA.

TRACTOR.

1,363,330.     Specification of Letters Patent.     Patented Dec. 28, 1920.

Application filed November 11, 1919. Serial No. 337,315.

*To all whom it may concern:*

Be it known that I, JOHN W. LIVERMORE, a citizen of the United States, residing at Fresno, county of Fresno, State of California, have invented certain new and useful Improvements in Tractors; and I do declare the following to be a full, clear, and exact description of the same, reference being had to the accompanying drawings, and to the characters of reference marked thereon, which form a part of this application.

This invention relates to improvements in tractors, and particularly to the wheeled type having all its wheels driven by the motive power.

The principal object of the invention is to provide a four wheel tractor, each pair of wheels being mounted to drive independently of those on the other side and so connected with the power plant that either or both pairs of wheels may be driven forward, held inactive or reversed, as may be desired.

This tractor is particularly intended to be made in small sizes, and used for drawing cultivators, etc., in orchards, where the overhanging branches preclude the use of a high tractor.

My improved wheel connecting feature by means of which the tractor is steered, renders this tractor a very flexible one to operate, as it can be turned completely around in a very small compass. This renders it especially valuable in orchard work, where it is necessary to have an easily handled and maneuvered machine to pass in and out between the rows of trees.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of the tractor.

Fig. 2 is a top plan view of the same, with the wheel and gear covers on one side removed to show the mechanism.

Fig. 3 is an enlarged detached view of the transmission case and the wheel operating mechanism.

Fig. 4 is a fragmentary side elevation of a clutch throwing lever in neutral position and the actuating cam therefor, showing also the demountable transmission case bearing the the clutch shaft.

Fig. 5 is an end view of the same, with the cam and bearing member in section.

Fig. 6 is a detached cross section through the tractor frame, showing the dust and ash pan thereunder.

Fig. 7 is a detached cross section through the wheel housing or cover.

Referring now more particularly to the characters of reference on the drawings, the numeral 1 denotes the outer side frames of the tractor, 2 similar inner frame members spaced therefrom and 3 the transverse end frames connecting the side frames.

Forward and rear pairs of wheels 4 and 5 respectively are mounted on stub shafts 6 in bearing boxes 7 on the frames 1 and 2, the wheels on each side being between the corresponding pair of frames 1 and 2.

On each wheel is mounted a large spur gear 8, each pair of gears on a side being connected in driving relation by a roller or similar gear 9.

A power plant 10, preferably a gas engine is mounted on the frames 2 between the front pair of wheels and the power thereof is transmitted to drive the rearmost of the gears 8 on the wheels in the following manner:—

At the rear of the engine is a common disk clutch 11 of any standard form adapted to break the driving connection between the engine and the transmission hereinafter described. This clutch is operated from a pedal 12 positioned at the rear of the frame within convenient reach of the foot of the driver of the tractor, who occupies a seat 13 thereon.

From this clutch the engine shaft 14 extends into a gear box 15 and has a bevel pinion 16 thereon.

This pinion meshes with a bevel gear 17 keyed onto a shaft 18 journaled in the box 15 and projecting therethrough on both sides a certain distance. Fixed on this shaft in the gear box and near opposite sides thereof are gears 19 of different diameters. These gears mesh with idler pinions 20, which in turn mesh with equal sized gears 21, loosely mounted on a jack shaft 22 journaled in the box 15 and projecting therethrough on both sides to the plane of the wheel gears 8. By reason of the interposition of these idlers, the shaft 22 will of course rotate in the same direction as the shaft 18.

The female portion 23 of a simple form of jaw clutch is formed with each gear 21, the double male portion 24 thereof being feather or spline mounted on the shaft 22 therebetween, being adapted for connection with either of the gears 21 by means of a throw lever 25 extending outside the gear box.

By this means, on account of the different sizes of the initial gears 19, the shaft 22 may be given two speeds with the same R. P. M. of the engine.

On each end of the shaft 18 beyond the box 15 is a common form of cone clutch 26, adapted to make or break connection between the said shaft and pinions 27 thereon beyond the clutches.

These pinions mesh with spur gears 28 loosely mounted on the shaft 22 and formed integral with or secured to roller pinions 29 adapted to mesh with the gears 8 on the wheels 5. The gears 28 are inside the frame 2, while the pinions 29 are outside the same. They are therefore provided with connecting hubs 30, which not only give more bearing contact with the shaft, but form journals for the shaft and gear unit on the frames 2, as shown at 31.

Formed with each gear 28 is one portion of a disk clutch 32, the coacting portion being spline mounted on the shaft 22. These clutches are preferably of the same type as that shown in my copending application for patent filed November 17th, 1919, Serial Number 338,504 and are thrown into operation by means of beveled collar members 33 slidably mounted on the shaft. Similarly the clutches 26 are operated by the sliding of the male members 26ª on the shaft 18.

Thus each of the gears 27 and 28 has clutch connection with the shaft on which it is mounted. Those on one side are entirely independent from those on the other, but each pair on a side is connected to be actuated synchronously, but in opposed or reversed relation, as follows:—

Surrounding each of the shafts 18 and 22 outside and near the box 15 is a circular and concentric cam member 34, whose total transverse variation is slightly greater than the total distance to be moved by the clutch member 26ª or the collar 33 in making or breaking connection. The arcuate length of the cam required to make this variation is about 90 degrees, and hence I have made each cam member with two opposed but similar surfaces.

Secured to the slidable clutch members by means of stationary collars 35 in which said members may rotate are vertical clutch-throw levers 36 positioned adjacent the cam members 34 and having opposed clips 37 thereon to engage the upstanding flange 34ª of the cam surfaces, these levers of course being adapted for longitudinal movement about the shafts 18 and 22 as their pivotal points.

The upper ends of these levers are connected by flexibly mounted links 38 operatively connected to a lever 39 pivotally mounted on the rear end frame 3 at one side of the seat 13. A similar lever 40 is of course positioned on the other side of the seat to actuate the clutches on that side. The two cam members 34 on a side are positioned in opposed arrangement, so that with a common movement in either direction of the levers 36 caused by the movement of the master levers 39 or 40, either one or the other of the clutches 26 and 32 will be thrown out of engagement with its gear while the other one is thrown in, while a vertical position of the levers 36 is neutral for both clutches.

In the operation of this feature, referring to Fig. 3 of the drawings, it will be seen on the right hand side of said figure that the levers 36 are shown in their rearmost position in which position the clutch 32 is thrown in, while the clutch 26 is disengaged.

The power from the engine is thus transmitted from the gear 16 to the gear 17, thence from the gears 19 to either of the gears 21, depending on the speed selected, thence through shaft 22 to the gear 28, pinion 29 formed therewith, and from the latter to the rear main wheel gear 8 to drive the wheels on that side. The clutch 26 being disengaged, the gear 27 merely turns idly on its shaft. A reverse movement of the levers 36 reverses conditions, disengaging clutch 32 and throwing in the clutch 26.

In that case the power is transmitted through the shaft 18 to gear 27, which meshing with gear 28 now loose on the shaft 22, causes the same to rotate in the reverse direction, thus of course imparting a reverse motion to the tractor wheels.

Under these conditions, the change speed gears 21 do not function, and hence only one speed may be had in reverse, without altering the engine speed.

A vertical or central position of the levers 36 causes both clutches to be disengaged, as stated.

While any of the three driving conditions—forward, neutral, or reverse—may be had by manipulation of the lever 39, any similar condition may be had on the other side of the tractor at the same time by proper manipulation of the lever 40 governing that side, and irrespective and independent of the driving relation on the other side. Thus the wheels on one side may be run forward, held idle, or reversed while those on the other side may be handled likewise.

Referring now more particularly to Figs. 4 and 5 of the drawings, I have incorporated in the transmission box of my tractor a certain other improvement which makes for ease of demounting and assembling.

The box 15 is provided with vertical slots 41 therein in alinement with the shafts 18 and 22. The shafts themselves are preferably mounted in roller or similar bearings 42 journaled in removable plates 43, set into the slots 41 and completely filling the same, secured to the box 15 by bolts 44 through flanges 45 on the plates 43 outside the box. The cam members are bolted to these plates, and thus also serve as retainers for the bearing members 42.

By means of this construction, by removing the bolts 44 and the bearing caps on the frames 2, either shaft 18 or 22 may be removed from the box with the gears remaining in position thereon without disturbing the other shaft or its gears.

Another feature of advantage I have mounted on my tractor is an arrangement for feeding grease to all the main wheel and gear bearings simultaneously, without the necessity of providing a separate grease cup for each bearing.

This device consists of a cylinder 46 (see Fig. 2) mounted on the tractor within reach of the driver. In this cylinder is a piston actuated by a flat-pitch screw 47 having a handle whereby it may be turned to move the piston up and down in the cylinder. Pipes 48 are screwed into the opposite end of the cylinder, and extend to all the main bearings and other points needing cup grease.

Since the cylinder and pipes are to be filled with grease, by turning the screw, an equal quantity of grease will be forced into all bearings at one time, thus not only saving time, but eliminating the danger of an inaccessible grease cup being overlooked, which would ultimately result in a burned out bearing.

Above the frames 1 and 2 the wheels are protected by removable housings or covers 49, which have an interior longitudinal and vertical partition 50 positioned between the wheels and the gears 8 and 9 so that dirt raised by the tread of the wheels will not fall on the gears.

Also I have positioned between the frames 2 and running the length of the tractor a dust and dirt guard 51 sloping down from the sides toward the center, and being provided with a longitudinal slot 52 along the center.

The pan is provided with and strengthened by transverse straps 53 extending thereunder, and being suitably bent at their upper ends as at 54 to be removably sprung between the inwardly facing flanges of the frames 2, the latter being preferably channel shaped.

By means of this pan, the greater amount of dirt stirred up by the tractor is prevented from rising into the machinery, since it will strike against the sloping sides of the pan and drop back, while at the same time such dirt and dust as finds its way above the pan will drop through the longitudinal slot therein, being hastened in its motion by the vibration of the tractor, which tends to prevent the dirt from clinging to the sloping sides of the pan.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A tractor comprising a frame, wheels mounted thereon in rigid and parallel alinement, those on a side being connected in driving relation independently of those on the other side, a transverse driven shaft turning in a forward direction, a parallel jackshaft connected to similarly turn, a pinion loosely mounted on each end of the jackshaft and arranged to turn the corresponding wheel, a gear formed with each pinion, a pinion loosely mounted on each end of the first named shaft and meshing with the gear, and means for transmitting the power of the engine of the tractor to either the gear or pinion on either side, independently of those on the other side.

2. A tractor comprising a frame, wheels mounted thereon in rigid and parallel alinement, those on a side being connected in driving relation independently of those on the other side, a transverse driven shaft turning in a forward direction, a parallel jackshaft connected to similarly turn, a pinion loosely mounted on each end of the jackshaft and arranged to turn the corresponding wheel, a gear formed with each pinion, a pinion loosely mounted on each end of the first named shaft and meshing with the gear, and independent means on each side for simultaneously transmitting the power of the engine of the tractor to either the gear or pinion while withholding it from the alternate one.

3. A tractor comprising a frame, wheels mounted thereon in rigid and parallel alinement, those on a side being connected in driving relation independently of those on the other side, a transverse driven shaft turning in a forward direction, a parallel jackshaft connected to similarly turn, a pinion loosely mounted on each end of the jackshaft and arranged to turn the corresponding wheel, a gear formed with each pinion, a pinion loosely mounted on each end of the first named shaft and meshing with the gear, and independent means on each side for simultaneously transmitting the power of the engine of the tractor to either the gear or pinion while withholding it from the alternate one, and for withdrawing the power from both gear and pinion at a time.

4. A tractor comprising a frame, wheels mounted thereon in rigid and parallel alinement, those on a side being connected in driving relation independently of those on the other side, a transverse driven shaft turning in a forward direction, a parallel jackshaft connected to similarly turn, a pinion loosely mounted on each end of the jackshaft and arranged to turn the corresponding wheel, a gear formed with each pinion, a pinion loosely mounted on each end of the first named shaft and meshing with the gear, a clutch between each gear and pinion and its corresponding shaft, and independent means on each side for simultaneously throwing in either clutch while disengaging the other, or disengaging both clutches.

5. A tractor comprising a frame, wheels mounted thereon in rigid and parallel alinement, those on a side being connected in driving relation independently of those on the other side, a transverse driven shaft turning in a forward direction, a parallel jackshaft connected to similarly turn, a pinion loosely mounted on each end of the jackshaft and arranged to turn the corresponding wheel, a gear formed with each pinion, a pinion loosely mounted on each end of the first named shaft and meshing with the gear, a clutch between each gear and pinion and its corresponding shaft, and a cam actuated lever for actuating each clutch, said levers on a side being connected for simultaneous movement and arranged to throw in one clutch while disengaging the other.

6. In combination with a driven shaft and a parallel jackshaft connected to turn in the same direction, a gear loosely mounted on the jackshaft, a pinion meshing therewith similarly mounted on the driven shaft, a clutch between the gear and pinion and their corresponding shafts, each clutch having a member slidable on the shaft to make or break connection in said clutch, a circular cam member mounted concentric with each shaft and in opposed relation, and a lever flexibly connected to each sliding clutch member and actuated by the cams to move the sliding members along the shafts in opposite directions with a movement of said levers in a plane at right angles to the shafts, said levers being connected to move simultaneously.

In testimony whereof I affix my signature in presence of two witnesses.

JOHN W. LIVERMORE.

Witnesses:
 M. E. HINDLE,
 GUSTAVE E. LUNDIN.